United States Patent [19]

Aderhold

[11] Patent Number: 5,309,093
[45] Date of Patent: May 3, 1994

[54] ELECTRONIC SPEED SIGNAL RATIO MEASURING APPARATUS FOR CONTROLLING OPERATIONS

[76] Inventor: Daniel O. Aderhold, 3024 Turkeyfoot Rd., Akron, Ohio 44311

[21] Appl. No.: 851,860

[22] Filed: Mar. 16, 1992

[51] Int. Cl.$^5$ .............................................. G01P 3/56
[52] U.S. Cl. ................................ 324/161; 324/140 D
[58] Field of Search ........... 324/160, 161, 166, 140 R, 324/140 D; 377/37, 39

[56] References Cited

U.S. PATENT DOCUMENTS

| | | |
|---|---|---|
| 3,197,137 | 7/1965 | Watson ........................ 324/140 D X |
| 3,488,452 | 1/1970 | Gunning et al. . |
| 3,564,216 | 2/1971 | Laycak ............................ 324/161 X |
| 3,896,377 | 7/1975 | Richardson .......................... 324/161 |
| 3,924,840 | 12/1975 | Nelson, Jr. .................. 324/140 D X |
| 3,960,410 | 6/1976 | Leitz et al. ....................... 324/161 X |
| 4,148,078 | 1/1979 | Riddle, Jr. . |
| 4,155,038 | 5/1979 | Merklinger et al. ........... 324/140 D |
| 4,291,343 | 9/1981 | Riddle, Jr. . |
| 4,349,832 | 9/1982 | Gallo . |
| 4,420,776 | 12/1983 | Jove et al. . |
| 4,470,080 | 9/1984 | Kimura . |
| 4,542,351 | 9/1985 | Okada . |
| 4,811,128 | 3/1989 | Ono et al. . |
| 4,878,166 | 10/1989 | Johnson et al. . |

*Primary Examiner*—Kenneth A. Wieder
*Assistant Examiner*—Warren S. Edmonds
*Attorney, Agent, or Firm*—Oldham, Oldham & Wilson Co.

[57] ABSTRACT

A ratio measuring apparatus which allows continuous monitoring of two or more digital signals so as to yield an indication of the ratio of frequencies between such signals for use in process control. The apparatus includes a channel transfer circuit adapted to rotate inputs or outputs in the apparatus for logical orientation thereof. The apparatus further includes primary and secondary counters, each of which is coupled to an input signal for processing thereof. These counters operate relative to one another for logical processing of the input signals to yield ratio information. The primary counter is coupled to a data latch system, acting as a temporary memory storage for the measured ratio information. The data latch may also be coupled to a display means. The secondary counter controls latching of data from the primary counter, to form the base counts by which the ratio information is determined, and also includes a reset decoder to reset both the primary and secondary counters after information transfer from the primary counter has occurred. An orientation decoder is used to evaluate whether the measured ratio information yields a ratio which is less than one, and will generate control signals to rotate the inputs or outputs via the channel transfer circuit. The ratio measuring apparatus and processing circuitry may be provided in a hand-held unit or rack mount configuration, for use in process parameter control in a manufacturing process, or the measurement of the relative ratio between high frequency digital information signals.

14 Claims, 5 Drawing Sheets

ELECTRONIC SPEED SIGNAL RATIO MEASURING APPARATUS FOR CONTROLLING OPERATIONS

BACKGROUND OF THE INVENTION

The invention generally relates to a digital signal processing apparatus adapted to measure the ratio of two or more digital signals. More particularly, the invention relates to a signal ratio measuring apparatus adapted to accurately monitor two or more high frequency digital signals, which are represented in terms of a relative ratio of the frequencies thereof for process control operations.

In many applications and environments, the relationship between various operating parameters of a process may be used to maximize the efficiency and cost effectiveness of the process. For example, a manufacturing process may include a variety of intermediate operations, the interaction of which results in the success of the entire process. The interaction between intermediate operations in a manufacturing or other process may be monitored by the relative operational characteristics between such intermediate operations. The information relating to such intermediate operations of the process may be represented in ratio form for ease of interpretation and analysis of process parameters.

Presently, for example, the operation of mechanical devices, such as motors, used in various manufacturing processes, may be analyzed by means of integrated monitoring devices, diagnostic equipment or the like. For example, a motors speed of operation may be monitored by a tachometer to determine whether the motor is operating within a desired operating range. Devices such as tachometers are commonly used in industrial manufacturing to measure the speed of operation of motor driven equipment within a process. This as well as other types of equipment measure the performance of independent portions of a system, and therefore do not provide any information regarding the interaction between these independent operations within a manufacturing process. Information regarding the interaction of various intermediate processes would allow enhanced process control and quality control functions to be achieved. Similarly, other processes besides industrial or manufacturing based, may also be enhanced with information regarding the interaction of intermediate operations within the overall process.

There are known digital based decoding apparatus which are designed to process two or more data streams transmitted through separate data channels in a synchronized manner. Such decoding apparatus are quite complicated and costly, and do not provide a relative indication of process parameters, represented as a ratio. Other known apparatus are designed to produce signals which vary as the ratio of the frequency of a first signal stream to a second signal stream. Such a system was used to generate a feedback signal for noise reduction in the recording of frequency modulated signals. Such an apparatus is not usable to determine the relative operational characteristics between speed and time based systems within a process, represented as a ratio.

SUMMARY OF THE INVENTION

Based upon the foregoing, there has been found a need to provide a signal ratio measuring apparatus which will allow evaluation of intermediate operations of a manufacturing or other process, represented as a ratio between operational parameters of such intermediate operations. It is therefore a main object of the invention to provide a signal ratio measuring apparatus which allows continuous monitoring of two or more digital signals so as to yield an indication of the ratio of frequencies between such signals for use in process control.

It is another object of the invention to provide information regarding intermediate operations of a process where such information is represented in ratio form with logical orientation.

Another object of the invention is to provide a ratio measuring apparatus adapted to automatically display a positive ratio and to indicate the higher frequency digital signal as represented by the ratio value.

Yet another object of the invention is to provide a ratio measuring apparatus which may be used with a variety of add-on circuits or devices to achieve additional results or control information based upon the measured ratio between two or more signals for a particular application or environment.

A further object of the invention is to provide a ratio measuring apparatus to give an indication of the ratio between two or more signals in an efficient and cost effective circuit configuration.

Another object of the invention is to provide a ratio measuring apparatus which may be configured as a hand-held apparatus or as a fixed device, for use in monitoring and controlling a manufacturing process.

The ratio measuring apparatus of the invention comprises a channel transfer circuit adapted to rotate inputs or outputs in the apparatus for logically orienting the input signals in a desired manner. The apparatus further includes primary and secondary counters, each of which is coupled to an input signal to the apparatus for processing thereof. The primary and secondary counters operate relative to one another for logical processing of the input signals to give an indication of the ratio therebetween. The primary counter is coupled to a data latch system, acting as a temporary memory storage for the measured ratio information. The data latch is also coupled to a display means for displaying new ratio information continuously monitored by the apparatus. The secondary counter controls latching of the primary counter to form the base counts by which the ratio information is determined. The secondary counter includes an information transfer decoder which allows information from the primary counter to be transferred to the data latch system for display. The secondary counter is also includes a reset decoder adapted to reset both the primary and secondary counters after information transfer from the primary counter has occurred. An orientation decoder is used to evaluate whether the measured ratio information yields a ratio which is less than one, and will generate control signals to rotate the inputs or outputs via the channel transfer circuit. An orientation indicator will then indicate which of the input signals to the ratio measuring apparatus is the higher frequency signal which may relate to an operational parameter of a system. The ratio measuring apparatus avoids the use of microprocessors in the determination of the ratio information, and therefore enables very high frequency signals to be accurately processed. The sensitivity of the measuring circuit may be modified to yield very accurate ratio indications as desired. The ratio measuring apparatus and processing circuitry may be provided in a hand-held unit or rack mount configuration, for use in process parameter control in a manufacturing process, the measurement of the relative ratio between high frequency digital information signals, or for like purposes. Additional circuitry may be used in conjunction with the base processing circuitry to yield a system adapted for use in a particular application environment, such as to convert input signals for processing, or to provide particular display characteristics of the ratio information. The apparatus may also be modified to yield measurements relative to the phase difference between signals, in terms of ratio information, or to yield an indication of operational stability. In this respect, for example, the apparatus may include an alarm or the like, which would be activated upon a measured ratio falling outside a predetermined range or the like.

BRIEF DESCRIPTION OF THE DRAWINGS

These and other objects and advantages of the invention will become apparent upon a further reading of the detailed description in conjunction with the drawings, wherein.

DETAILED DESCRIPTION OF THE INVENTION

Figure 1:
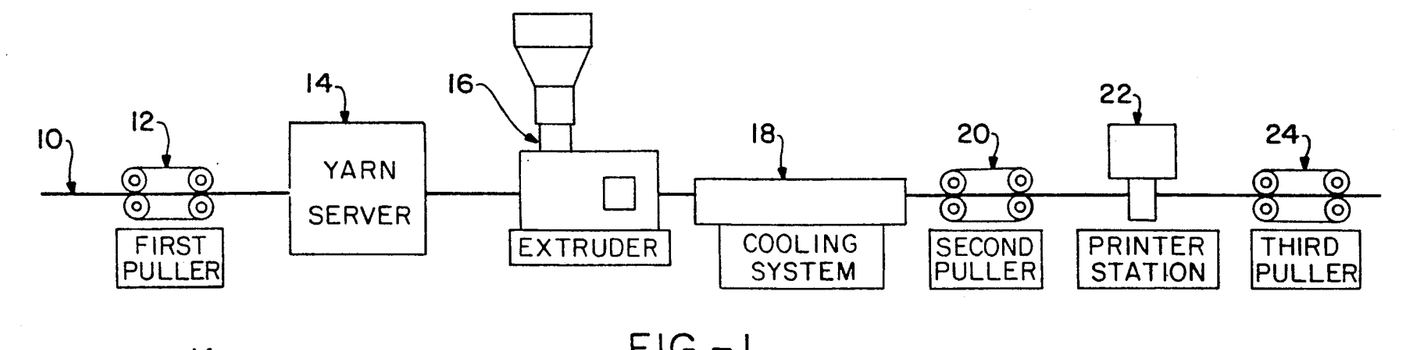
FIG. 1 shows a non-limiting example of an industrial manufacturing process in which the ratio measuring apparatus of the invention could be utilized.

Turning now to FIG. 1, there is shown a manufacturing process which includes various intermediate operations. As an example, the ratio measuring apparatus of the invention may be utilized as an industrial instrument for measuring the ratio between the speed of operation of various motor controlled apparatus used in this manufacturing process. In virtually any manufacturing process, raw materials are utilized as an input to the process which is designed to produce a finished product from those raw materials. Within the overall manufacturing process are a variety of intermediate operations which must work synergistically with one another to achieve the desired output product. The relationship between these intermediate operations and the consistency with which each intermediate operation is performed will determine the quality of the finished product. Where quality is determined or defined as the maintenance of proper product specifications, the importance of uniformity in the intermediate operations of the manufacturing process as well as the interrelationship of such intermediate operations is critical to an efficient and cost effective automated manufacturing process. As a non-limiting example of a possible application environment of the ratio measuring apparatus of the invention, the manufacturing process depicted in FIG. 1 may comprise the production of high pressure hose in an automated process. In such a process, a hollow flexible tubing 10 is fed to a first puller unit 12 adapted to transport tubing 10 to a yarn serving machine 14 which creates a braided pattern of yarn strands around the tubing 10. The braiding of this material onto the tubing 10 provides uniform resistance to a high pressure fluid introduced to tubing 10. The braided pattern created by the yarn serving machine 14 controls the pressure resistivity of the high pressure hose.

From the yarn serving machine 14, the hose 10 having the yarn encasement thereon is fed to an extruder 16 adapted to coat the tubing 10 from the yarn serving machine 14 with a uniform thickness of a polymer resin material. From the extruder 16, the coated high pressure hose is cooled in a cooling system 18 and then directed to a second puller unit 20 before being printed at printer station 22. A third puller unit 24 is provided to convey the finished high pressure hose out of the processing system. It should be evident that in such a processing system, the first puller unit 12, second puller unit 20, and the third puller unit 24, must work in conjunction with one another to convey the tubing through the system at the proper speed and tension. The second puller 20 is used to stabilize the high pressure hose between the yarn serving operation at 14 and the printing stage 22 of the manufacturing process. The second puller unit 20 must therefore work in conjunction with the first puller unit 12 and third puller unit 24 to maintain the hose at a predetermined tension in the process. Similarly, the extruder 16 works in conjunction with the yarn serving machine 14, and may be set up in a cross-head configuration which allows the braided tube to pass through the extruder head and tooling so as to accomplish the final coating of the high pressure hose product.

In addition to the interaction of the intermediate steps of the manufacturing process, the intermediate operations themselves may require specific operational characteristics to maximize efficiency of the overall system as well as to obtain the desired product quality. For example, in the yarn serving operation, several bundles of yarn will be braided together on the hose at the same time, wherein the distance between the intersections in the braided pattern will represent the amount of pressure resistance the hose will be capable of. The specification of the braid pattern, relating to the tightness of the pattern, is therefore relevant to the pressure specification of the high pressure hose. The tightness of the braid pattern will in turn be directly related to the speed of the hose passing through the yarn serving machine, requiring the first puller unit 12 and second puller unit 20 to convey the tubing at a predetermined speed. As an example, evaluation of the braiding pattern in the yarn serving process may be performed by measuring the angle of one yarn bundle being wrapped around the initial tube until the desired angle indicating the desired braid pattern is achieved.

Such an evaluative technique would create unnecessary scrap due to the inability to effectively set up each intermediate operation to properly interrelate with the other intermediate operations. This inability is due to the fact that each intermediate operation operates independently of the other operations in the manufacturing process. The initial set up of a manufacturing process will therefore require considerable experimental or preliminary evaluation of each intermediate operation, or excessive trial and error procedures resulting in an inefficient and cumbersome process.

Alternatively, the specification of the braid pattern or any operational parameter or specification could be defined using the ratio measuring apparatus of the invention, wherein the difference in speeds of operation of the driving motors or other equipment associated with a process could be monitored. For example, the operation of the yarn serving machine 14 and the second pulling unit 20, in terms of a ratio value, may be effectively used to set up operation of these intermediate stages so as to properly interrelate as desired. In this example, the difference in the speeds of operation of the yarn serving machine 14 and second puller unit 20, may be determined by the rotational rate of the motor drive shaft(s) associated with each intermediate operation. The rotational rate of the motor drive shafts may be used as inputs to the ratio measuring apparatus of the invention to effectively maximize operational parameters of the intermediate stages relative to one another quickly and efficiently. Additionally, the ratio measuring apparatus may be used to continuously monitor the operational parameters of these intermediate processes to provide process control information after initial set up has been completed.

Similarly, in this example, the extrusion process at extruder 16 requires precise control of the extrusion as well as the speed of the hose therethrough. More particularly, the polymer material introduced to the extruder will have an output velocity dependent upon the pressure created within the barrel of the extruder in the tooling chamber. Therefore, the rotational rate of the screw within the barrel will relate directly to the amount of pressure in the tooling chamber and the velocity of the extruder material. This in conjunction with the speed of the hose will determine the thickness and quality of the final coating on the high pressure hose. The operational speed of the motor driving the screw within the barrel of the extruder 16, along with the speed of the motor associated with the second puller unit 20, must be controlled relative to one another to achieve the proper manufacturing specifications. Again, the ratio measuring apparatus could have as inputs thereto the rotational speeds of the output drive shafts of each motor associated with the extruder 16 and puller unit 20 to effect proper and desired operation of each of these intermediate stages relative to one another.

Figure 2:
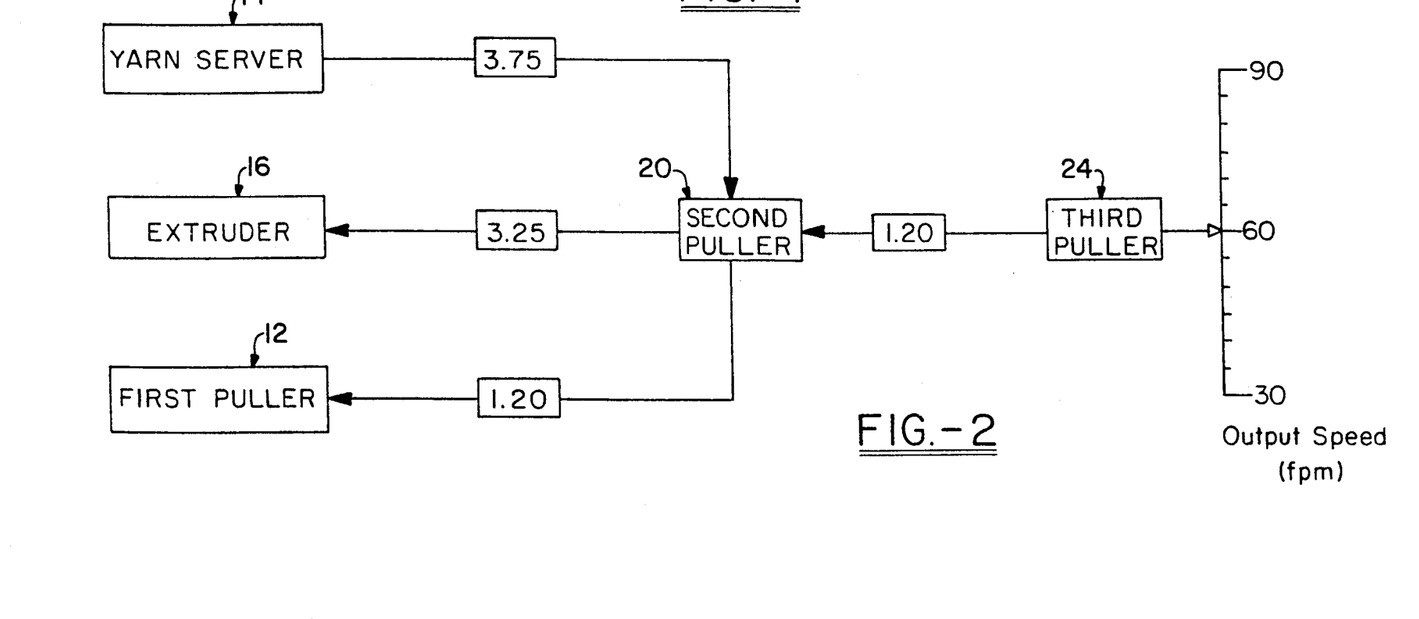
FIG. 2 shows a process structure diagram for the manufacturing process as shown in FIG. 1.

As should be evident from the foregoing example, each intermediate operation of the entire manufacturing process can be effectively controlled with respect to the other intermediate operations to maximize efficiency and cost effectiveness in a manufacturing or other process. As seen in FIG. 2, a process structure diagram represents the interrelationship between these intermediate operations to achieve the desired quality and output characteristics in the manufacturing process. As seen in this process structure diagram, each intermediate operation is interrelated with other associated intermediate operations in the manufacturing process by means of a ratio which will achieve the desired manufacturing specifications for a predetermined output. As an example, for an output of 60 f.p.m. of the high pressure hose, the second puller unit 20 is set to operate at 1.20 times the speed of the first puller unit 12 so as to convey the tubing through the yarn serving machine 14 and extruder 16 at a predetermined speed. The yarn serving machine is in turn operated at a speed of 3.75 times the speed of the second puller unit 20 to achieve the desired braiding pattern specification as previously described. The second puller unit 20 may also be operated at a speed 3.25 times the speed of operation of the extruder 16, and more particularly the screw within the barrel thereof, so as to achieve the desired final coating of the high pressure hose. Lastly, the third puller unit may be operated at a speed 1.20 times the speed of the second puller unit to achieve the desired printing characteristics at printing stage 22. These process parameters are examples of the interrelationship between these intermediate operations to achieve the desired output speed of the 60 f.p.m., and it should be recognized that upon modifying the output speed, each ratio between the intermediate operations would remain essentially constant within normal operating parameters.

The use of a ratio measuring apparatus to set up and maintain desired operational characteristics in a manufacturing or other process should be apparent, as well as the ability to control and maintain the proper operational characteristics in an efficient manner. The process structure diagram using the ratio information provides excellent information with regard to set up of a process as well as monitoring the performance of intermediate operations in the process.

Figure 3:
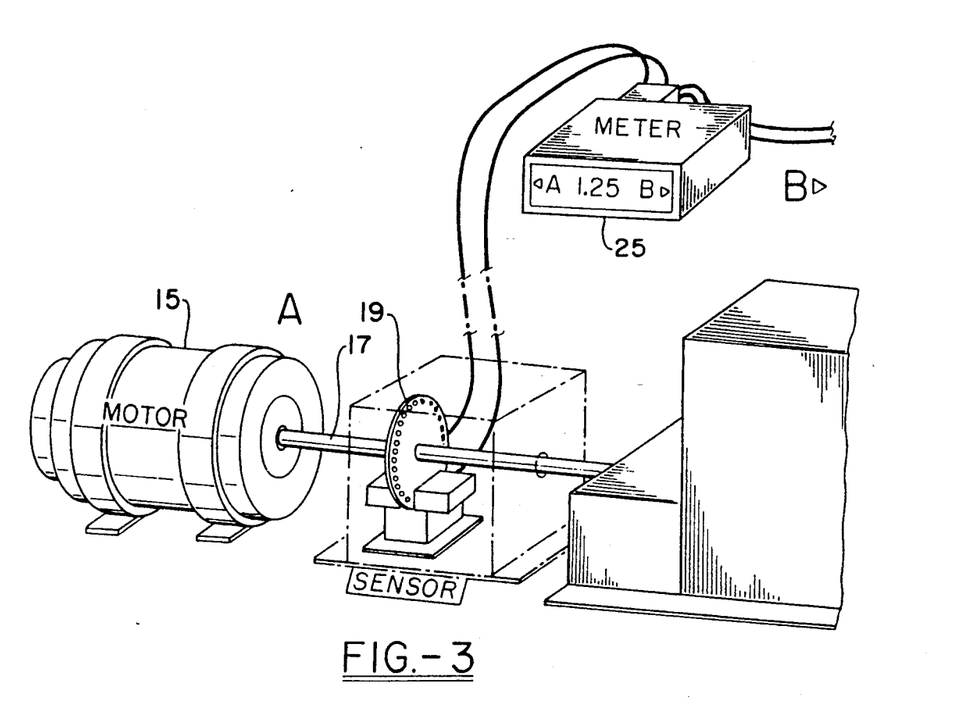
FIG. 3 shows a non-limiting example of an input source signal to the ratio measuring apparatus of the invention, indicating its use in a manufacturing process.

As merely an example of a possible arrangement to generate the desired input digital signals for which a ratio measurement is to be obtained, there is shown in FIG. 3 a conventional electric motor 15 having an output shaft 17 associated therewith. On the output shaft may be mounted a disk 19 having a plurality of apertures 21 formed therein. The disk 19 may be used in conjunction with an optical source and detection system which can be used to monitor rotation of the disk 19 and therefore the output shaft 17. As an example, a photodiode may be positioned on one side of the disk 19 with a photodetector positioned on the opposite side in alignment with apertures 21. Light generated from the photodiode will be coupled to the photodetector through the apertures 21 as the disk 19 rotates so as to generate pulses of light which may be used to generate a square wave digital signal as an input to the ratio measuring apparatus generally designated 25. A similar input may be coupled to the ratio measuring device 25 from another location to provide the desired ratio measurement. It should be recognized that this is merely one example of a possible source signal which can be created and processed to achieve a ratio measurement in accordance with the invention.

Figure 4:
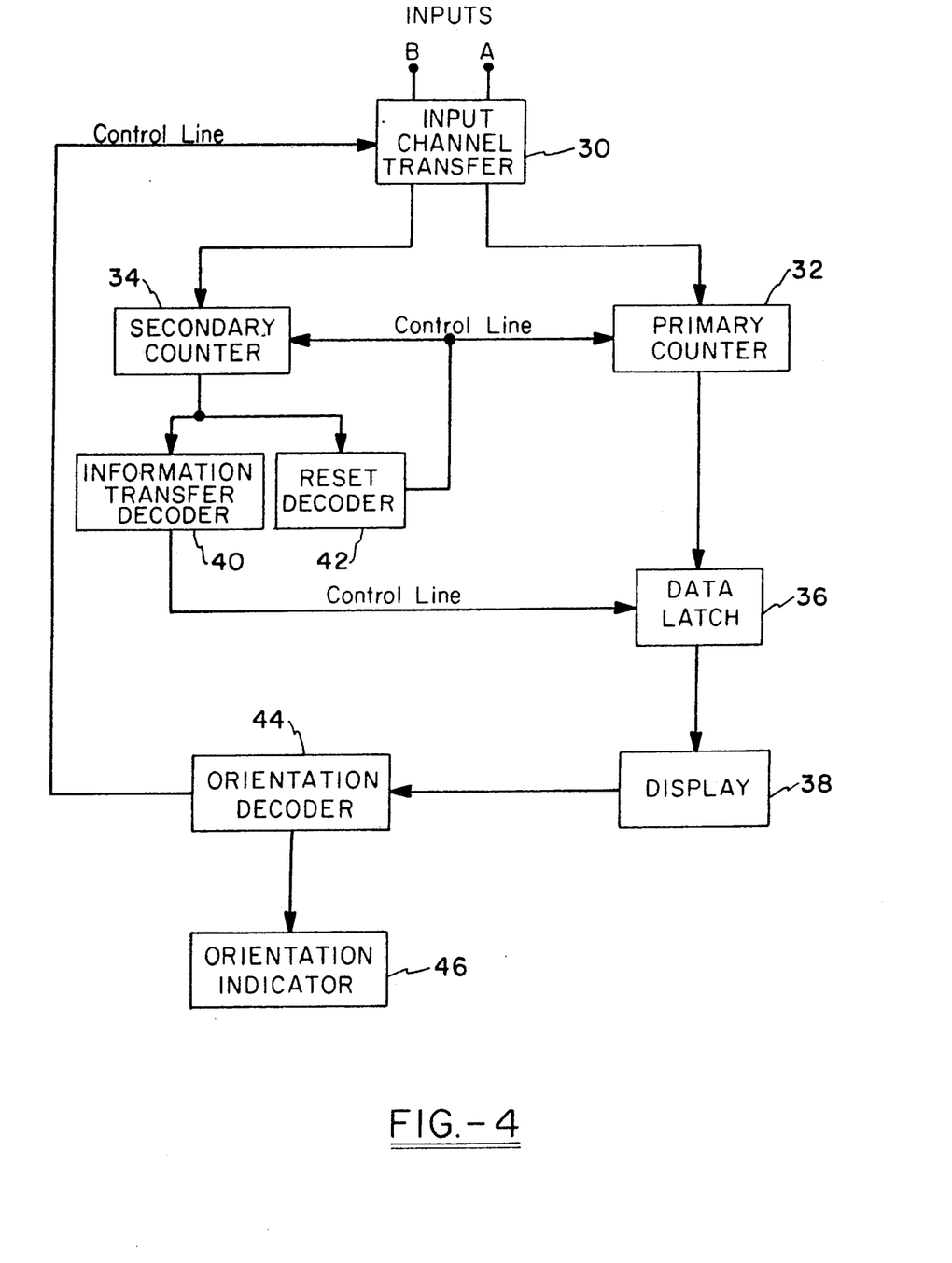
FIG. 4 shows a block diagram of a preferred embodiment of the ratio measuring apparatus of the invention.

Turning now to FIG. 4, there is shown a block diagram of the basic ratio measuring apparatus in accordance with the invention. The ratio measuring apparatus has as inputs thereto at least two distinct digital signals, marked as Input A and Input B in FIG. 4. As will be described hereinafter, the input signals are preferably square wave signals generated in any of a variety of ways from a variety of sources. The inputs A and B are coupled to an input channel transfer (ICT) unit 30, which may be configured as an input switching unit adapted to rotate coupling of Inputs A and B to the measuring circuit. The ICT unit 30 will perform rotation of Inputs A or B depending upon the input frequencies thereof, such that the higher or lower frequency signals will be properly coupled to desired portions of the measuring circuit for processing thereof. Although the ICT unit will be described in the preferred embodiment as switching or rotating the inputs A or B, it should be recognized that a similar function could be performed on the outputs of the ICT unit 30 if desired. The input channel transfer unit 30 is coupled to a primary counter 32 as well as a secondary counter 34.

As previously mentioned, the function of the input channel transfer unit 30 will be to couple the appropriate input A or B to the appropriate counter 32 or 34 to perform desired processing of the input signals. In the preferred embodiment, the higher input frequency will be oriented or coupled to the primary counter to provide a logically oriented ratio measurement which will be greater that one. The theory of operation of the primary counter 32 and secondary counter 34 is based upon the logical relativity between both counters and the input signals. The primary counter 32 is then coupled to a data latch system 36, which provides a temporary memory storage area for ratio information developed in the primary counter 32. The information from the data latch system 36 may then be coupled to a display 38, to provide an external indication of the measured ratio. Ratio information from the primary counter 32 and data latch system 36 is controlled by means of the secondary counter 34 and the associated information transfer decoder 40 and reset decoder 42. The secondary counter 34 is adapted to have the lower input frequency coupled thereto by means of the input channel transfer unit 30, so as to provide a base unit of measure against which the primary counter will operate to generate the ratio information. The secondary counter 34 works in conjunction with the information transfer decoder 40, which is adapted to allow information developed in the primary counter 32 to be transferred to the data latch system 36 for subsequent display on display 38. The transfer logic of the information transfer decoder 40 will be dependent upon a unit mode setting of the secondary counter, indicating the accuracy with which ratio measurements are made. Also coupled to the secondary counter 34 is the reset decoder 42 which is adapted to reset both the primary counter 32 and secondary counter 34 after the ratio information developed has been transferred to the data latch system 36 for display.

It is seen in the block diagram of FIG. 4, that control lines extend from the information transfer decoder 40 to the data latch system 36, and from the reset decoder 42 to the primary counter 32 and secondary counter 34. After the ratio information has been downloaded from the primary counter 32 to the data latch system 36, it may thereafter be displayed on display 38 which in turn will control an orientation decoder 44, which is used to evaluate whether the ratio information represents a ratio which is less than one. Upon an indication of a ratio measurement less than one, the orientation decoder 44 will provide a signal to the input channel transfer unit 30 for rotation of the inputs as represented by the control line coupled thereto. The orientation decoder 44 may also be coupled to an orientation indicator 46, which will provide an external display indicating which input signal has the higher frequency, or orients the ratio information to the higher frequency input signal. In the preferred embodiment, the rotation of inputs will always generate a ratio measurement greater than one so as to be logically oriented, with the orientation indicator providing the information as to which input signal is of higher frequency.

Figure 5A:
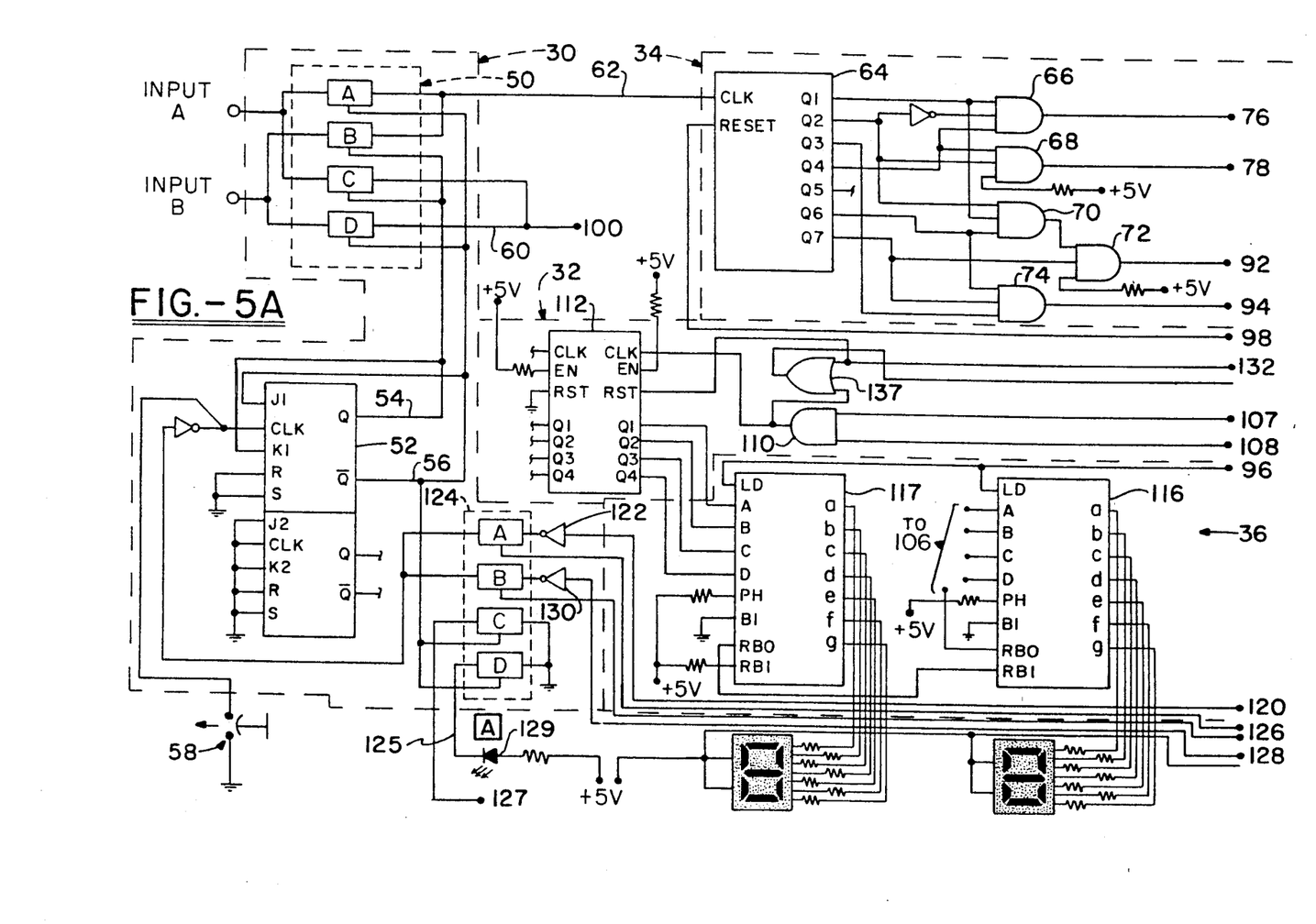
FIGS. 5a and 5b show an electrical schematic diagram of a preferred embodiment of the ratio measuring apparatus of the invention.

The basic ratio measuring apparatus as described with reference to FIG. 4 will be further described with respect to the electrical schematic digrams of FIGS. 5a and 5b. In FIG. 5a, there is shown input signals A and B, which are represented as square wave digital signals of predetermined frequency. Such square wave signals are preferred in that they are easily interpreted by the counters associated with the ratio measuring apparatus, but it should be understood that other digital signals may be applied as inputs to the ratio measuring apparatus. The input signals may be generated from any source, such as a square wave generator or other signal generator. Alternatively, for an analog signal, various triggering devices or other digital signal sources may be used to generate a suitable square wave signal to be processed in the ratio measuring apparatus.

The input signals are initially coupled to the input channel transfer circuit 30 as previously described. The input channel transfer circuit 30 may be a CMOS quad-bilateral switch 50, to which inputs A and B are coupled. The switch 50 also has as an inputs thereto, logic signals from a dual J-K master flip-flop 52 forming part of the input channel transfer circuit 30. The flip-flop 52 is adapted to toggle the inputs A and B via logic control signals generated on lines 54 and 56. The output of flip-flop 52 on line 54 will generate a high or low logic output, which will in effect control the output of switch 50, so as to couple the input A and B to respective portions of the measuring circuit as desired. The flip-flop 52 also may have a momentary switch 58 coupled thereto, which will provide a reset of the input channel transfer unit 30 to an original initialized configuration.

Upon initialization of the ratio measuring apparatus, the configuration of the quad switch 50 is such that input A will be coupled to the primary counter on output line 60 of the input channel transfer unit 30. Similarly, input B will be coupled to the secondary counting system on output line 62 of the input channel transfer unit 30. As seen in the FIG. 5a, the secondary counter 34 may comprise a seven stage binary counter integrated circuit 64. The counter 64 is adapted to decode the input digital signal at a ten count or another count which may be selected by the user as will be hereinafter described. The output data lines from counter 64 are coupled to a series of logic circuits, which in the preferred embodiment may be a plurality of triple three-input AND gates 66, 68, 70, 72 and 74. As seen in FIG. 5b, a unit mode switch 82 may be used to set the count mode setting of the secondary counter 64. In the preferred embodiment, the unit mode switch may be set to mode 1/10 or 1/100 indicating the accuracy with which the ratio measurement is to be made. If the unit mode switch 82 is set to 1/10 units, the output of counter 64 will be coupled to AND gates 66 and 68, which are adapted to decode the pulse count of ten to form the base unit of measure of the ratio information. Additionally, the counter 64 in conjunction with AND gates 66 and 68, are adapted to decode a pulse count of eleven or an additional count to the base unit of measure set in secondary counter 34. The output of AND gates 66 and 68, on lines 76 and 78 respectively, are thereafter coupled to another quad-bilateral switch 80 as seen in FIG. 5b. The switch 80 is coupled to the user selectable unit mode switch 82.

When the unit mode switch 82 set for 1/10 units, the output of counter 64 on lines 76 and 78 will be coupled through switch 80 on output lines 84 and 86. Alternatively, if the unit mode switch 82 is set to 1/100 units, the quad switch 80 will couple the output of counter 64 through AND gates 70, 72 and 74 on lines 92 and 94 to be coupled through switch 80 to output lines 88 and 90. In the unit mode 1/100, the output of counter 64 will be coupled to the logic gates 70, 72, and 74, wherein AND gates 70 and 72 are adapted to decode the pulse count of one hundred to generate an output on line 92, and AND gate 74 is adapted to decode the pulse count of one hundred and one to generate an output on line 94. Thus, depending upon the setting of unit mode switch 82, the output of counter 64 will represent decoded pulse counts of ten and eleven or one hundred and one hundred and one respectively in the preferred embodiment.

Figure 5B:
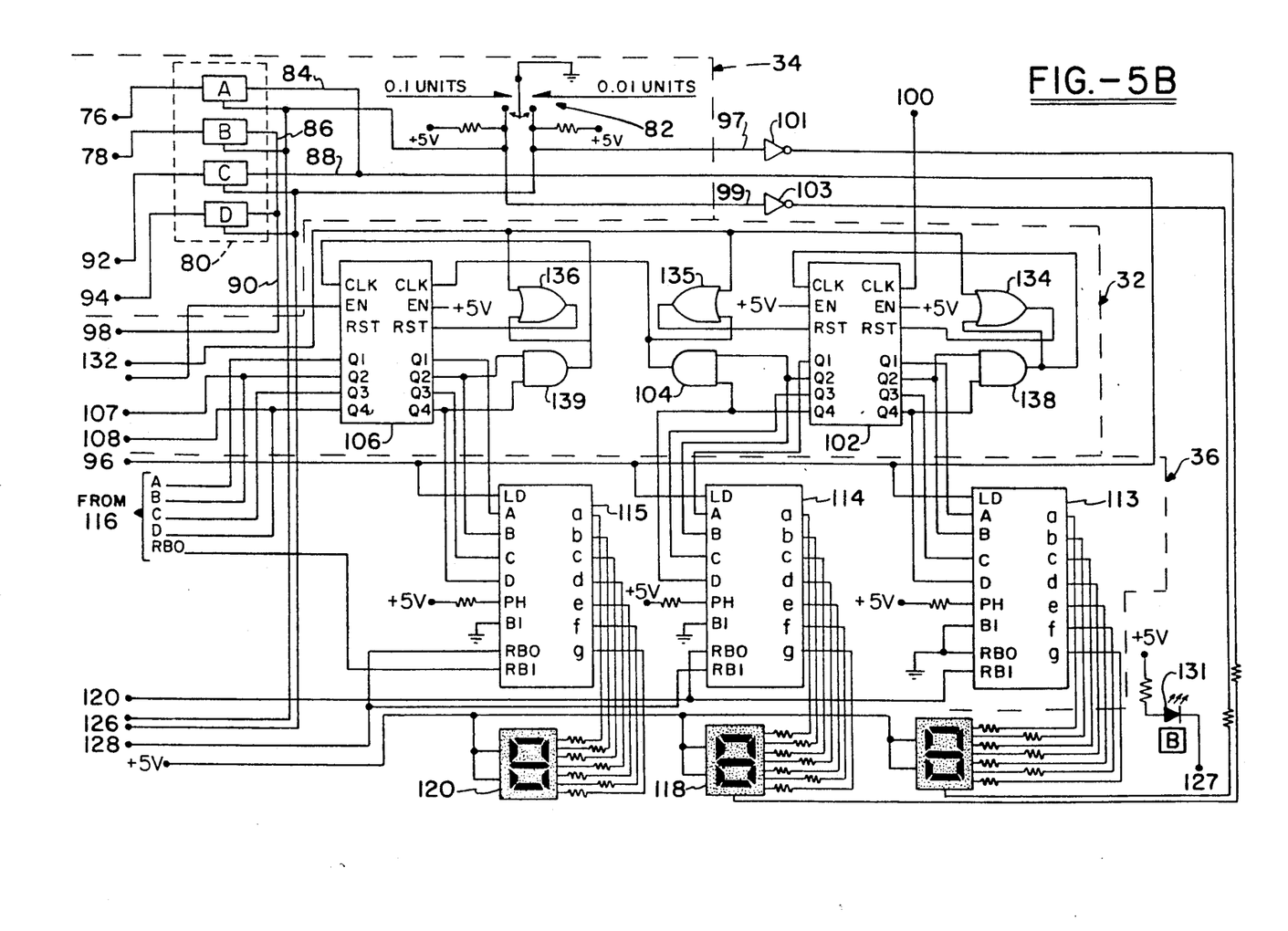

The output of quad switch 80 on lines 84 and 88, depending upon the setting of unit mode switch 82, will be coupled to output line 96, which in turn is coupled to the data latch system generally designated 36 in FIGS. 5a and 5b. In the unit mode 1/10 setting the output line 86 of quad switch 80, which represents a pulse count of eleven at counter 64, is coupled back to counter 64 via line 98 to reset counter 64 to enable continuous processing of the input signals. Similarly, if the unit mode switch 82 is set for 1/100 units, the output of quad switch 80 on line 90, representing a pulse count of one hundred and one, will also be output on line 98 so as to reset counter 64.

As previously described, the secondary counter 34 provides the base unit of measure for the ratio measurement obtained with the apparatus, and controls ratio information transfer from the primary counter 32 to the data latch system 36. Additionally, the secondary counter 34 will control resetting of its own counting function as well as that of the primary counter 32, to enable continuous monitoring of the digital input signals. In this manner, the ratio measuring instrument acts as a continuous use instrument which may be used to measure fluctuation of the input signals. Due to the use of the primary and secondary counters, the information and rejection rates of the instrument are very high and allow continuous monitoring of even rapidly fluctuating input signals. The speed of operation of the ratio measuring apparatus allows unique uses of the apparatus in a variety of environments. The apparatus may also be used to continuously monitor the stability of systems operations, such as monitoring the stability of mechanical equipment, wherein the amount of fluctuation may represent the operating characteristics of such equipment. The apparatus may therefore be useful as a diagnostic tool, wherein variations in measured ratios between various equipment or the like in a system may indicate improper functioning of the equipment. The monitoring of fluctuations of the input signals may also be used as a quality control method whereby deviations from a predetermined ratio measurement would indicate a deviation from desired quality control standards. It should be recognized that the apparatus could be configured to sound an alarm or yield another indication of fluctuations, and may be coupled to a data storage means to provide historical information regarding operational parameters.

The primary counter 32 is supplied with one of the input signals A or B depending upon the configuration of the input channel transfer unit 30. Upon initialization of the measuring circuit, input A will be coupled to the primary counter 32 on line 100 from the input channel transfer circuit 30. The input signal is coupled to a dual binary up counter 102, which is adapted to count a predetermined number of square wave pulses, which in the preferred embodiment will comprise a count of ten. The counter 102 will in turn generate an output signal upon reaching the predetermined count which is coupled through an AND gate 104 which is coupled to the clock input of another dual binary up counter 106. The counter 106 is also adapted to count a predetermined number of pulses, and will generate an output on lines 107 and 108, which are also coupled to an AND gate 110 as seen in FIG. 5a. The output of AND gate 110 is in turn coupled to the clock input of a dual BCD up counter 112. Each of the counters 102, 106 and 112 forming the primary counter 32 will also generate output signals coupled to a series of BCD to seven segment/decoder/drivers 113-117 forming the data latch system 36. The information output from the primary counting system 32 to each of the ICs 113-117 will represent the number of pulses counted by the primary counting system 32 of the input signal coupled thereto. As previously mentioned, the base unit of measure of the ratio information is controlled by the secondary counting system 34, and upon receiving an information transfer signal from the secondary counter 34, the information from the counters 102, 106 and 112 will be downloaded to the data latch system 36 for display on a series of LEDs, as an example of a type of display which may be used. It is also seen that the secondary counter 34 produces outputs on lines 97 and 99 through hex inverters 101 and 103, which are directly coupled to LEDs 118 and 120 to generate the decimal point at the proper location in the display.

More specifically, when the secondary counter 34 counts to ten pulses, an output signal is generated from switch 80 on line 96, which is in turn coupled to the load input of each of the BCD to seven segment LED drivers 113-117. Upon receiving the load signal, the inputs to the ICs 113-117 from the primary counter 32 will be loaded and processed for display accordingly. One of the functions of the LED drivers 113-117 is to generate ripple blank in (RBI) and ripple blank out (RBO) signals, which are adapted to activate a particular LED or to blank the LED so as not to display any number. For example, a RBO signal will be generated to blank certain LEDs so as not to display extraneous zeros in a numerical ratio. The ripple blank out signal is also uniquely used as a decoder, which is essentially adapted to decode zero or blank. It can be recognized that upon initialization of the apparatus, if input A, which is initially coupled to the primary counting system 32, is of lower frequency then input B, the measured ratio between the signals will produce a fractional value of one which would have to be displayed. In this situation, in the unit mode setting of 1/10 units, the IC 114 of the data latch system 36 would produce a ripple blank out signal so as to blank LED 118, representing the first whole number of the display. The RBO signal is also coupled on output line 120 to the hex inverter 122 and switch 124, forming a part of the input channel transfer system 30. The switch 224 also has an input thereto a HI signal from the unit mode switch 82 on line 126. In this way, the RBO signal from IC 114 will cause switch 124 to output a HI signal to the clock input of the dual J-K master flip-flop 52, which in turn will rotate the inputs via quad switch 50. Similarly, if the one 1/100 unit mode is selected, a ripple blank out signal from IC 115 of the data latch system 36 will be generated to blank LED 120 as seen in FIG. 5b. This RBO signal is also coupled on output line 128 to a hex inverter 130 and switch 124. In a similar manner, the switch 124 will produce an output signal to the flip-flop 52 so as to rotate the inputs A and B via switch 50. The toggling of the inputs depending upon the input signals will insure that a ratio measurement of greater than one is displayed, and provides proper orientation of the signals as desired. It is another function of the switch 124 to generate outputs on lines 125 and 127 which are coupled to LEDs 129 and 131, which give an indication of the orientation of the input signals, as to which signal is of higher frequency.

Although the primary counting system has been described as including logic gates to facilitate processing of the digital inputs, various other counters may be used to achieve similar functions. The logic circuits in the primary counter eliminate the need for a plurality of stand alone counters for decoding of each number to be counted, and increases the speed of processing significantly.

The secondary counter system 34 is also adapted to reset both the primary and secondary counting systems in a simultaneous manner to allow continuous monitoring of the input signals. In the preferred embodiment, the secondary counter will count to the pulse count of eleven, upon which an output signal is generated on line 90. The output signal of the secondary counter 34 is a reset signal which is coupled directly to the reset input of dual BCD up counter 112 on line 132, and is coupled to the input of a plurality of OR gates 134-137, forming a part of a logic system associated with the primary counter 32. The logic system further includes AND gates 104 and 110 as previously described, as well as AND gates 138 and 139. It should be seen that each of the OR gates 134-137 also has as an input thereto the output of AND gates 138, 104, 139 and 110 respectively. As a HI signal input to the OR gates 134-137 will couple a signal to the reset inputs of the ICs 102 and 106, a HI signal from secondary counter 34 will effect reset of each of the counters 102, 106 and 112 either directly or indirectly.

Figure 6:
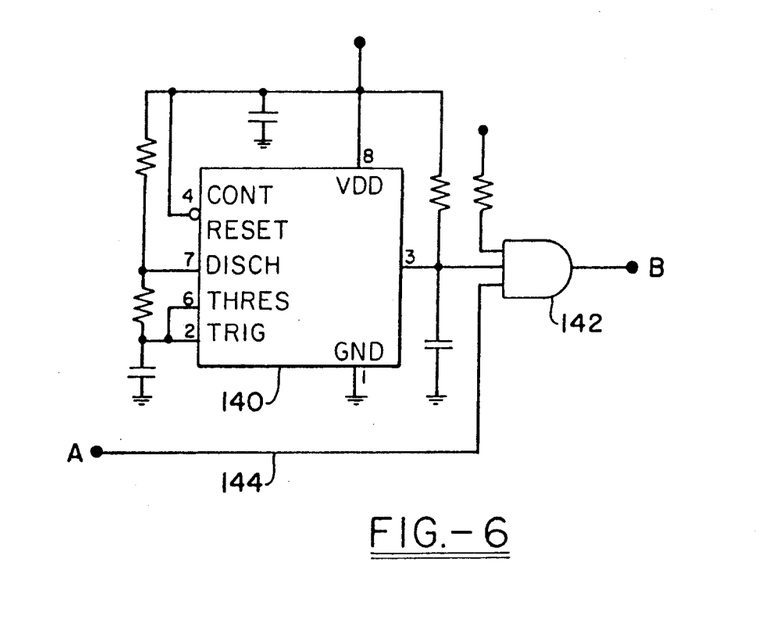
FIG. 6 shows an information display delay circuit which may be used as an add-on circuit in conjunction with the processing circuitry of the ratio measuring apparatus as described with reference to FIGS. 5a and 5b.

Turning now to FIG. 6, an example of an add-on circuit which may be used in conjunction with the ratio measuring circuit of the invention will be described. In certain environments, the frequency of the input signals A and B may be so high as to effect the readability of the information display means which may be used with the apparatus. In such a case, it would be desired to delay the information display by a predetermined time interval during operation so as to alleviate this problem. The circuit shown in FIG. 6 is adapted to lock the data latch system or store the ratio information in memory for display for a predetermined time interval, after which normal operation will resume for another predetermined time interval before again locking the data latch system for display. This add-on timing circuit may be coupled into the measuring circuit as described with reference to FIGS. 5a and 5b, at the location of the load inputs to each of the BCD to seven segment/decoder/drivers 113-117. The timing circuit including IC 140 is designed to have the signal coupled to the ICs 113-117 at the load input, coupled to a triple 3-input AND gate 142 on line 144. The AND gate 142 also has as an input thereto an output from IC 140 which will generate a signal at predetermined time intervals to allow coupling of information through AND gate 142. The IC 140 may comprise a conventional clock circuit, wherein the generation of an output signal is controlled by the time constant of RC circuits associated therewith. It should be evident that a wide variety of add-on circuits may be applicable for use with the ratio measuring apparatus of the invention for a particular environment in which the apparatus is to be used.

Although the invention has been described in terms of preferred embodiments thereof, it should be understood that various modifications, alternatives and equivalents will become apparent to those skilled in the art. Accordingly, the scope of the present invention should be defined only by the appendant claims and equivalence thereof.

What is claimed is:

1. An electronic signal ratio measuring apparatus, comprising, a measuring circuit means having at least two digital frequency signals input thereto, said measuring circuit adapted to measure the ratio of the frequencies of said at least two signals, said measuring circuit means comprising a channel transfer means adapted to couple said at least two input signals to at least a primary counter means and a secondary counter means, wherein said channel transfer means enables the lower frequency signal of said at least two signals to be coupled to said secondary counter means with the remaining input signal(s) coupled to said primary counter means, said secondary counter means being adapted to count predetermined numbers of digital pulses corresponding to the frequency of said lower frequency signal and to generate output signals indicating counting of said predetermined numbers, such that said lower frequency signal provides a basis for ratio measurement between said at least two input signals, said primary counter means being adapted to count the digital pulses corresponding to the frequency of the other of said at least two input signals, said primary counter being coupled to a data latch means, wherein upon said secondary counter reaching a first predetermined count, a first output signal from said secondary counter will operate to latch the count of said primary counter means to said data latch means, said data latch means being coupled to an indicating means to provide ratio information being an indication of the ratio of the count of said primary counter means relative to said first predetermined count of said secondary counter means, said secondary counter also adapted to generate a second output signal upon said secondary counter means reaching a second predetermined count, said second output signal coupled to both the primary and secondary counter means to affect resetting thereof for continuous monitoring of said at least two input signals.

2. The ratio measuring apparatus of claim 1, further comprising, an orientation decoding means coupled to said data latch means, being adapted to monitor said ratio information to determine whether the measured ratio between two of said input signals is greater than one, wherein if said ratio is less than one, said orientation decoding means will generate an output signal coupled to said channel transfer means to rotate said input signals such that said input signals are coupled to the other of said primary or secondary counter means for processing.

3. The ratio measuring apparatus of claim 2, wherein, said orientation decoding means will rotate said input signals to couple the slowest frequency input signal to said secondary counter means, such that ratio information developed by said measuring circuit will always be indicated as a ratio greater than one.

4. The ratio measuring apparatus of claim 2, wherein, said data latch means comprises a plurality of LED driver integrated circuits, said LED driver integrated circuits each adapted to drive an LED forming said indicating means and having a ripple blank out output, wherein said orientation decoding means comprises utilizing said ripple blank output signal from at least one of said one of said LED driver integrated circuits indicating a measured ratio less than one, which is coupled to said channel transfer means to rotate said input signals between said at least primary and secondary counter means.

5. The ratio measuring apparatus of claim 1, further comprising,
an orientation indicating means coupled to said channel transfer means to yield an indication of which of said input signals is of higher frequency.

6. The ratio measuring apparatus of claim 1, wherein,
said secondary counter means is a seven stage binary counter integrated circuit and said first predetermined count of said secondary counter is the pulse count of ten, such that said ratio information will comprise the number of pulses counted in said primary counter means relative to the count of ten in said secondary counter means.

7. The ratio measuring apparatus of claim 1, wherein,
said secondary counter means is a seven stage binary counter integrated circuit and said first predetermined count of said secondary counter is the pulse count of one hundred, such that said ratio information will comprise the number of pulses counted in said primary counter means relative to the count of one hundred in said secondary counter means.

8. The ratio measuring apparatus of claim 1, wherein, said at least two input signals are generated from a digital signal generating means having as an input thereto an analog signal representative of the operation of a mechanical device.

9. The ratio measuring apparatus of claim 8, wherein, said mechanical device is a motor having an output drive shaft, wherein means to measure the rotational speed of said output drive shaft will generate an analog signal representative of said rotational speed which is converted to a digital signal to provide said input signals to said measurement circuit means, wherein said ratio information will represent the relative rotational speeds between two of said motors.

10. The ratio measuring apparatus of claim 1, wherein,
said at least two digital frequency input signals are square wave signals.

11. The ratio measuring apparatus of claim 1, wherein,
said measuring circuit means is supported within a housing having external connections for said at least two input signals, and said indicating means is a display means coupled to said data latch means to yield an external indication of the ratio measurement between said at least two input signals.

12. The ratio measuring apparatus of claim 11, wherein,
said housing is adapted to be hand-held such that said ratio measuring apparatus is portable to monitor system operations within a process.

13. The ratio measuring apparatus of claim 11, wherein,
said housing is adapted to be rack mountable to allow said ratio measuring apparatus to be fixedly positioned to monitor system operations within a process.

14. The ratio measuring apparatus of claim 1, further comprising,
a timing circuit coupled to said data latch means so as to couple said ratio information from said data latch means to said indicating means at predetermined time intervals.

* * * * *